(12) United States Patent
Gekhter

(10) Patent No.: US 11,170,419 B1
(45) Date of Patent: Nov. 9, 2021

(54) METHODS AND SYSTEMS FOR TRANSACTION DIVISION

(71) Applicant: SharePay, Inc., Northbrook, IL (US)

(72) Inventor: Eugene Gekhter, Northbrook, IL (US)

(73) Assignee: SharePay, Inc., Northbrook, IL (US)

( * ) Notice: Subject to any disclaimer, the term of this patent is extended or adjusted under 35 U.S.C. 154(b) by 710 days.

(21) Appl. No.: 15/687,128

(22) Filed: Aug. 25, 2017

Related U.S. Application Data

(60) Provisional application No. 62/380,347, filed on Aug. 26, 2016.

(51) Int. Cl.
  *G06Q 30/00* (2012.01)
  *G06Q 30/06* (2012.01)
  *G06Q 10/10* (2012.01)
  *H04L 29/06* (2006.01)

(52) U.S. Cl.
  CPC ....... *G06Q 30/0613* (2013.01); *G06Q 10/107* (2013.01); *H04L 63/083* (2013.01)

(58) Field of Classification Search
  CPC ........ G06Q 30/00; G06Q 20/00; G06Q 10/00; G06Q 10/107; G06Q 30/0613; H04L 63/083
  See application file for complete search history.

(56) References Cited

U.S. PATENT DOCUMENTS

| | | | | |
|---|---|---|---|---|
| 5,715,314 A * | 2/1998 | Payne | .............. | G06Q 10/087 705/26.35 |
| 6,850,917 B1 * | 2/2005 | Hom | .............. | G06Q 20/206 705/18 |
| 9,760,936 B1 * | 9/2017 | Shaw | .............. | G06Q 30/0279 |
| 9,990,620 B2 * | 6/2018 | Sivaraman | .............. | G06Q 20/322 |
| 2007/0156592 A1 * | 7/2007 | Henderson | .............. | G06Q 10/06 705/51 |
| 2007/0299736 A1 * | 12/2007 | Perrochon | .............. | G06Q 30/0603 705/26.41 |
| 2009/0288012 A1 * | 11/2009 | Hertel | .............. | G06Q 20/02 715/738 |

(Continued)

OTHER PUBLICATIONS

Garun, Natt, "Restaurant-booking app Reserve now lets you automatically split the bill among friends." Jul. 16, 2015 <https://thenextweb.com/apps/2015/07/16/restaurant-booking-app-reserve-now-lets-you-automatically-split-the-bill-among-friends/> (Year: 2015).*

(Continued)

*Primary Examiner* — Abby J Flynn
(74) *Attorney, Agent, or Firm* — McDonnell Boehnen Hulbert & Berghoff LLP

(57) ABSTRACT

Methods and systems for transaction division are disclosed herein. An example system may allow the cost of a cart of items (e.g., one or more items) to be easily shared among multiple consumers. In order to partition the cost with other potential payees, the system may provide an interface that allows an initial consumer to send notifications that invite other potential participants to share the cost of the cart based on amounts specified by the initial consumer. The system may also determine when the total cost of the cart has been received and notify the seller accordingly. In some instances, the system may generate a token that corresponds to the transaction for the cart of items and use the generated token to detect when other portions of the total cost for the cart are received.

16 Claims, 8 Drawing Sheets

(56) References Cited

U.S. PATENT DOCUMENTS

| | | | | |
|---|---|---|---|---|
| 2010/0030578 A1* | 2/2010 | Siddique | G06Q 10/0637 | 705/3 |
| 2010/0078472 A1* | 4/2010 | Lin | G06Q 20/405 | 235/379 |
| 2012/0185355 A1* | 7/2012 | Kilroy | G06Q 30/0633 | 705/26.8 |
| 2012/0215660 A1* | 8/2012 | Cavagnaro | G06Q 20/12 | 705/26.41 |
| 2013/0046679 A1* | 2/2013 | Davoust | G06Q 20/227 | 705/39 |
| 2013/0238464 A1* | 9/2013 | Bank | G06Q 30/06 | 705/26.41 |
| 2014/0156508 A1* | 6/2014 | Argue | G06Q 20/32 | 705/39 |
| 2014/0172704 A1* | 6/2014 | Atagun | G06Q 40/02 | 705/44 |
| 2015/0254663 A1* | 9/2015 | Bondesen | G06Q 20/405 | 705/44 |
| 2015/0310408 A1* | 10/2015 | Anderson | G06Q 20/32 | 705/39 |
| 2016/0035005 A1* | 2/2016 | Kumar | G06Q 30/0633 | 705/26.8 |

OTHER PUBLICATIONS

De Artola, Andres; Buschman, Jordan; and Sehatti, Ashley, "OmniSplit: a mobile food ordering platform for restaurant staff and patrons" (2015). Computer Science and Engineering Senior Theses. 47. https://scholarcommons.scu.edu/cseng_senior/47 (Year: 2015).*

* cited by examiner

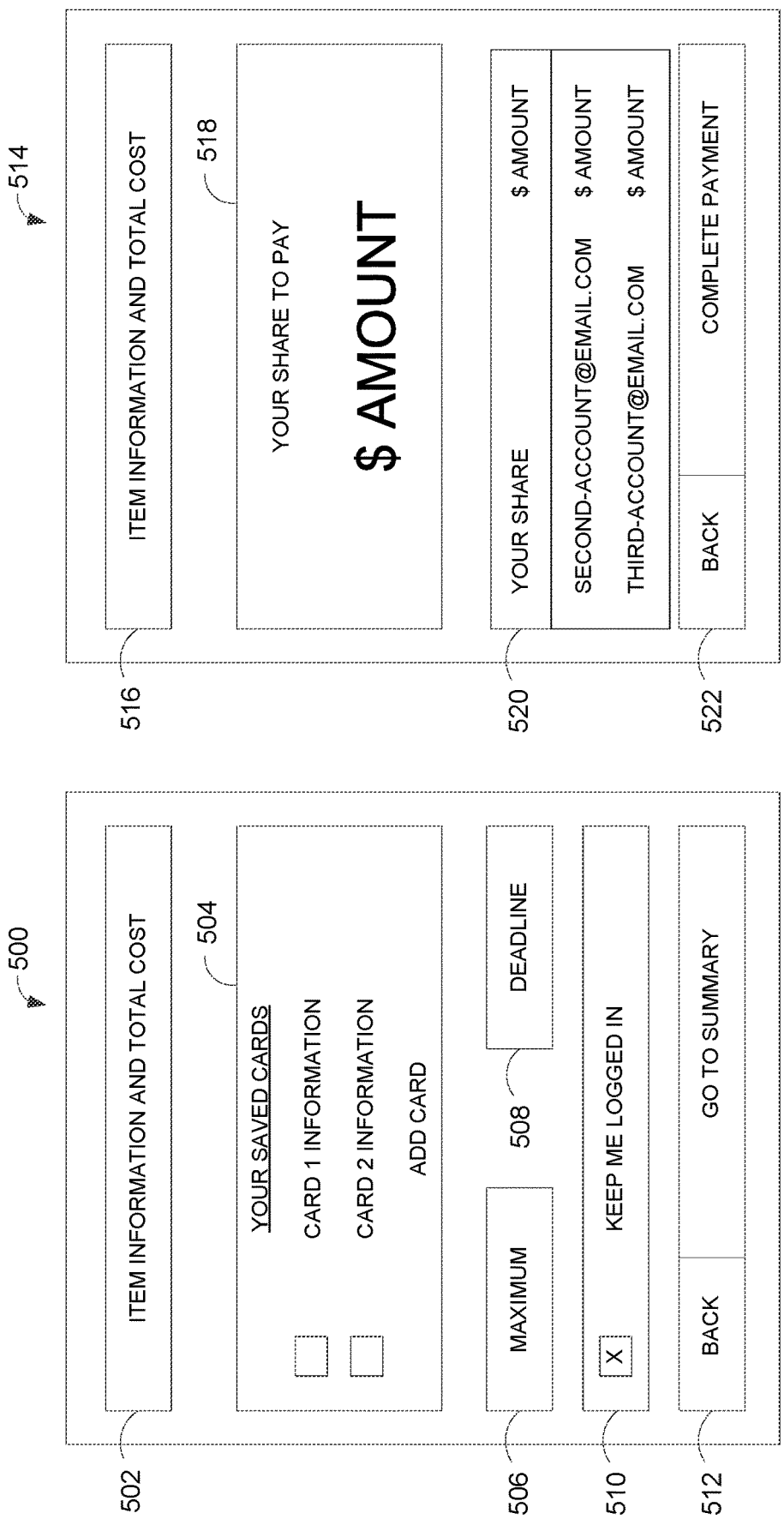

```
SharePayCart.init({
    key: sharepayPk, //public key which SP uses to recognize merchant
    cartType: 1, // 1 = product, 2 = subscription
    cart: { // cart object with required properties
        title: data.title, //title for the overall cart
        image: data.image, //image for the overall cart
        cartTotal: data.cartTotal, // cart total when adding items, ship, tax, and subtracting discount
        shipTotal: data.shipTotal, // shipping total if any
        taxTotal: data.taxTotal, // tax total if any
        discountTotal: data.discountTotal, // discount total if any
        email: data.email, // email of user on merchant site
        items: data.items // list of items added to user's shopping cart
    },
    token: function(token){
        data.token = token; // token generated by SP to be used for updating cart or retrieving data
    },
    onSuccess: function(){ // event triggered after user has successfully completed their share of payment
        sendSharePaySuccessBackend().then(function(data){
            orderSuccessful(data.orderId);
        });
    }
}, false); //set true to update cart (requires cartToken parameter)
```

FIGURE 6

METHODS AND SYSTEMS FOR TRANSACTION DIVISION

CROSS REFERENCE TO RELATED APPLICATION

The present patent application claims priority to U.S. Provisional Patent Application Ser. No. 62/380,347, filed on Aug. 26, 2016, the entire contents of which are hereby incorporated by reference.

BACKGROUND

Unless otherwise indicated herein, the materials described in this section are not prior art to the claims in this application and are not admitted to be prior art by inclusion in this section.

Recent market trends often show that the number of consumers who prefer to shop online over shopping at brick and mortar stores continues to grow. Online shopping, also known as e-commerce, offers various benefits to potential consumers that traditional stores cannot, such as the ability to browse and purchase various items from the convenience of home merely using a device connected to the Internet. As a result, consumers can save time while also avoiding the travel and time restrictions (i.e., store hours) associated with shopping at physical stores. For at least these reasons, e-commerce continues to attract more consumers with many companies looking for ways to improve their online-shopping platform to boost their overall online presence.

SUMMARY

Example implementations relate to methods and systems for transaction division. An example share system may provide one or multiple interfaces that enable multiple consumers to share the cost of a cart of items (e.g., one or more items) from a seller, such as an online merchant. Particularly, the system may permit an initial consumer to compile a cart of items on a platform of a seller and subsequently partition the total cost (or a portion of the total cost) owed to the seller with one or more other participants. The system may obtain information (e.g., contact information, amounts requested) from the initial consumer in order to provide notifications to one or more other potential participants that invite the potential participants to share the cost of the cart. As such, when the system determines that the complete payment of the total cost of the cart has been received, the system may notify the seller accordingly.

In one aspect, an example method is provided. The method may include receiving, at a system from a device associated with a first account, a request to partition a total cost for an item with one or more participants, and responsive to the request, providing an interface for receiving: (i) login information and an initial portion of the total cost for the item from the first account, and (ii) share information specifying requested amounts and contact information for the one or more participants. The method may include generating a token that includes information indicative of: (i) the item, (ii) the share information, and (iii) a deadline for receiving the total cost for the item, and sending, by the system using the generated token, notifications via the contact information to the one or more participants, wherein the notifications include the requested amounts and the deadline. The method may also include, responsive to receiving the total cost for the item by the deadline, providing an indication to the seller that the total cost for the item has been received.

In another aspect, an example non-transitory computer readable medium having stored thereon executable instructions that, upon execution by a computing device, cause the system to perform functions is provided. The functions may include receiving, from a device associated with a first account, a request to partition a total cost for an item with one or more participants, and responsive to the request, providing an interface for receiving: (i) login information and an initial portion of the total cost for the item from the first account, and (ii) share information specifying requested amounts and contact information for the one or more participants. The functions may further include generating a token that includes information indicative of: (i) the item, (ii) the share information, and (iii) a deadline for receiving the total cost for the item, and sending, using the generated token, notifications via the contact information to the one or more participants, wherein the notifications include the requested amounts and the deadline. The functions may also include, responsive to receiving the total cost for the item by the deadline, providing an indication to the seller that the total cost for the item has been received.

In a further aspect, an example system is provided. The system may comprise at least one processer. The system also may comprise a memory having stored thereon executable instructions that, upon execution by the at least one processor, cause the system to perform functions. The functions may include receiving, from a device associated with a first account, a request to partition a total cost for an item with one or more participants, and responsive to the request, providing an interface for receiving: (i) login information and an initial portion of the total cost for the item from the first account, and (ii) share information specifying requested amounts and contact information for the one or more participants. The functions may further include generating a token that includes information indicative of: (i) the item, (ii) the share information, and (iii) a deadline for receiving the total cost for the item, and sending, using the generated token, notifications via the contact information to the one or more participants, wherein the notifications include the requested amounts and the deadline. The functions may also include, responsive to receiving the total cost for the item by the deadline, providing an indication to the seller that the total cost for the item has been received.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5A depicts an example payment selection interface.

FIG. 5B depicts an example payment confirmation interface.

FIG. 6 depicts an example token generation operation.

DETAILED DESCRIPTION

Figure 1:
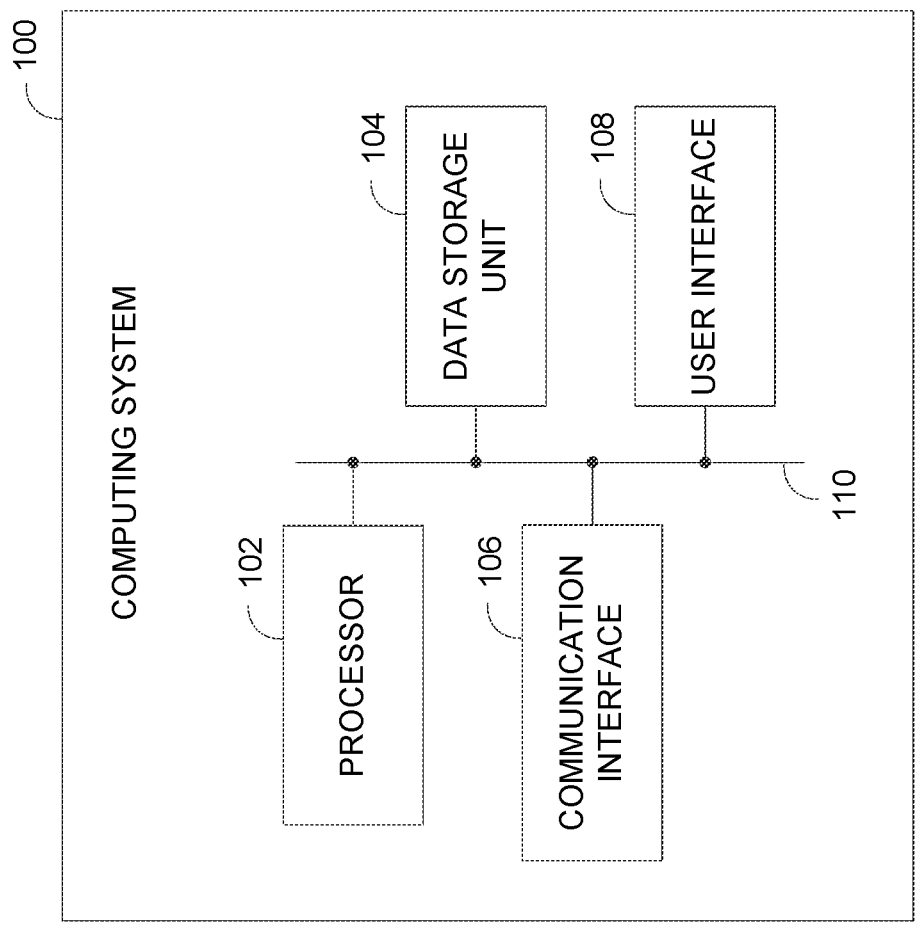
FIG. 1 illustrates a block diagram showing some components of an example device.

In the following detailed description, reference is made to the accompanying figures, which form a part hereof. In the figures, similar symbols typically identify similar components, unless context dictates otherwise. The illustrative implementations described in the detailed description, figures, and claims are not meant to be limiting. Other implementations may be utilized, and other changes may be made, without departing from the scope of the subject matter presented herein.

It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one.

E-commerce, also known as online shopping, continues to increase in popularity with more consumers opting to shop anytime from any location via a computing device with an Internet connection rather than traveling to brick and motor stores during particular store hours. Although the increase use of e-commerce has changed the ways that companies and consumers interact, online store platforms (e.g., websites, applications) of merchants often lack the ability to allow a group of consumers to divide or "share" the cost of an item or items. Rather, a consumer typically must decide between purchasing an item online from a merchant individually and attempting to recoup payment for the items from others consumers directly or waiting to buy the item after collecting the contributions from other payers upfront. The above ways and other potential ways of splitting the total cost for an item can often waste the consumer's time and can sometimes even result in the consumer failing to receive payments from other consumers who originally indicated that they wanted to contribute.

Disclosed herein are methods and systems that aim to help consumers to divide the total cost for one or multiple items purchased online. An example share system may serve as an interface that can enable a consumer (e.g., an initial user) to share the cost of one or more items (e.g., a cart of items) with other participants. Particularly, in some instances, the share system may enable a first consumer to initiate the purchase of an item from a website or application of a seller while also enabling the first consumer to provide information that the share system uses to notify other consumers designated by the first consumer to contribute to split the total cost of the purchase. For example, the share system may enable a first consumer to equally divide the total cost of a cart of items with three other consumers such that the four consumers each pay a quarter of the total cost. Accordingly, within example implementations, the share system may enable the total cost of one or multiple items to be split among a group of consumers while also ensuring that the seller of the items receives complete payment.

An example share system may operate in various ways with regards to a seller's platform. In some example implementations, a share system may operate directly on a seller's website or application. For instance, the share system may be embedded in a format with the platform of the seller such that a consumer may view the share system as a part of the seller's platform. In other examples, the share system may operate independently from a seller's website or application. In such an arrangement, the share system may communicate with the website or application the seller to facilitate and enable division of the cost for the item or items. For instance, upon receiving a selection of an option to partition the total cost of a cart of items, the platform of a seller may send the consumer to a new platform (e.g., a new webpage) of the share system that enables the share system to facilitate the transaction.

As indicated above, an example share system may provide an interface that can allow an initial consumer to partition the cost of a cart of items purchased from an online platform of a seller. The manner of dividing the total cost can vary within examples. In some instances, the share system may receive a request from a consumer to divide the cost with other consumers equally. In other examples, the share system may receive a request from a consumer to split the total cost of a cart in a specified manner (e.g., the initial consumer pays half and requests for other potential consumers to contribute the remaining cost). Other examples of dividing the total cost of a cart of items are possible.

In some examples, the share system may enable an initial consumer to pay for only a portion of the total cost of an item or items in order to initiate division of the transaction. As such, the share system may provide a platform that enables other consumers to contribute to complete the total cost resulting in the transaction being completed with regards to the consumers' side. For instance, the share system may further provide an interface that enables the initial consumer to also request payment of the remainder of the total cost of the item(s) from one or more other participants. This way, the consumer may utilize the share system to initiate the purchase of an item without having to pay the total cost of the item upfront. Rather, the share system may allow other participants to complete the transaction by providing an interface that allows the other participants to submit the remaining portions of the total cost for the item(s) owed.

In some examples, in order to enable a consumer to initiate a partition of the total cost (or part) of a transaction, the share system may allow the initial user to specify other participants that will receive notifications from the system describing the items within the transaction along with amounts that the participants are requested to contribute. The share system may provide notifications via email, text, or other ways of communicating with potential participants.

In addition, the share system may also notify the seller when the total cost of the item(s) is received. In response to receiving the notification, in some examples, the seller may proceed to complete the seller's end of the transaction (i.e., provide the purchased items or services to the consumers).

In this disclosure, a consumer can correspond to a person or entity that may use the share system to pay for an item or items. Other terms can be used to describe the consumer, such as user or participant. Additionally, as indicated, the share system may split the cost of an item with other participants. As such, the term "item" can represent a single item or multiple items, such as cart of items that a consumer may compile on a website of a seller. Examples of items can include products, services, subscriptions, and physical or digital materials, among other possibilities. Further, within examples, a seller can correspond to an individual seller or a company. For instance, a seller can be an individual seller that uses a larger platform associated with a company to sell goods or services to potential consumers. In other instances, a seller may correspond to the company selling goods or services.

In some example implementations, to initiate the division of a transaction for an item, a website of a seller may include an option to use the share system. For example, the seller's website may present the option to use the share system during the checkout of a cart of items from the website. In other instances, the share system may correspond to the only checkout method for the seller's website. As such, upon receiving a request from a user, the share system may present an interface that requests for input from the user to set up the division of the transaction.

The interface of the share system may require the user to present login information (e.g., an email and password), set up a new account with the share system, or continue using the share system as a guest. Within examples, the share system may accept different types of credentials during the initial login into a previously set up share account. For example, the share system may allow a user to link a social media or email account and use that login as the share system login. Similarly, the share system may also accept other indications that confirm the user's proper access to the account, such as a biometric input (e.g., fingerprint scan).

The share system may utilize accounts to enable more efficient subsequent use of the share feature. Particularly, a user account set up with the share system may enable the user to store credit card, billing information, and shipping address information for easier access. The user account can also receive and store contacts (e.g., other participants' email addresses) for the user to access while using the share system.

Upon receiving login information or an indication that the user would like to continue as a guest, the share system may enable the user to set up the division of the total cost of an item or items with other potential participants. In particular, the share system may adjust the interface (e.g., visual interface for inputs) to allow the user to enter contact information for potential participants that will receive a notifications for payment for a portion of the total cost of the item(s) from the share system. For example, the share system may allow the initial user to enter email addresses for other participants that may split the cost of the item.

In addition, the share system's interface may further enable the initial user to adjust the amounts each participant (including the user) is requested to contribute in order to complete the purchase of the item(s). For instance, the initial user can divide the cost of a cart of items equally among all included participants or may specify unique amounts that each participant is requested to contribute. In some implementations, the share system may automatically adjust the amounts specified by the initial user to equal the total cost of the item(s). In a further implementation, the share system may require that the initial user specifies amounts that add up to equal the total costs of the items. As such, the share system may block the initial user from proceeding with the setup until the amounts specified equal the total cost.

When setting up the initial division of the total cost for an item using the share feature, the share system may require the initial user to pay at least a portion of the total cost. The initial payment may serve as an indication to the seller that the consumer does in fact intend to purchase the selected item. In a further implementation, the share system may include an option that allows the initial user to delay the initial payment for a given period of time.

In addition to providing contact information for proposed participants that may contribute to the cost of an item, the share system may also request the initial user to provide a deadline by which the participants should provide the payments by. Particularly, the share system may request and possibly put limitations upon the deadline so that the potential purchase of the item does not remain open a period of time that is unreasonable for the seller of the item to accommodate. As such, the initial user may use the deadline to help persuade others to contribute their payments in a timely matter or as a way to learn when a potential participant chooses not to contribute.

In a further implementation, the share system may generate a deadline without user input, which may be based on various factors, such as the type and cost of the item, the number of participants, and input from the seller. The share system may notify participants about the deadline for completing the transaction within the notifications requesting payment.

In a further aspect, the share system may also present the initial user and possibly other participants with an auto-contribute option, which can allow a participant (e.g., the initial user) to automatically cover any unpaid portions that are not paid by the deadline. With this configuration, the share system may simply charge any remainder of the total cost to the initial user (or other participants that selected the auto-contribute option) rather than canceling the transaction due to a failure to receive the full payment by the deadline. In some implementations, the share system may allow any participant to select an auto-contribute option when the participant pays their respective portion.

In some implementations, the share system may generate a token to represent the information associated with the transaction. For instance, when the share system receives enough set up information from the initial user, the share system may generate a unique token that represents information for the cart of items. Particularly, the token may include information provided from the initial user and as well as information about the seller, the item, and the deadline for the payments. As such, the share system may generate the token to a unique configuration for secure storage and transfer. The share system may also use the generated token to check for the arrival of outstanding payments for the item and may send the token to the seller, such as when the share system detects complete payment for the transaction.

In a further aspect, the share system may be configured to engage the participants specified by the initial user in order to request for payments to complete the transaction. As an example, the share system may provide notifications that request payments using contact information provided by the initial user. The notifications may arrive as an email, application alert, text message, among other possibilities, and can include information, such as information about the item, the amount of the requested payment, instructions indicating how to submit the payment, the deadline for submitting the payment, etc. In some instances, the share system may include an option to create a new account within the notification that enables a potential participant to quickly create an account with the share system for subsequent use. The share system may also be configured to provide reminders to consumers that have been selected to share the total cost of an item, but have not been paid yet. For instance, the share system may enable consumers who have already paid their portion to set guidelines for when the share system reminds other consumers that have not yet contributed.

After sending out the notifications to the potential participants requesting portions of the total cost owed to complete the transaction, the share system may use the generated token corresponding to the item to check for incoming payments. For example, the share system may operate in a loop periodically checking for payments using the generated token. The share system may also send the generated token to another entity that can monitor for incoming payments.

Upon receiving the total cost of the item(s) by the deadline, the share system may provide an indication to the seller that complete payment was received. For instance, the share system may generate a report based on the generated token that includes payment information for sending to the seller. In some examples, the share system may transmit the generated token to the seller as a way to indicate that the complete payment was received.

In some instances, the share system may determine that the deadline has passed and all the outstanding payments from potential participants have not been submitted. As a result, the share system may check whether or not the auto-contribute option was selected. For instance, the share system may reference the generated token to see if the initial user and/or another participant selected the auto-contribute option. In the case that the auto-contribute option was selected, the share system may charge the participant(s) that selected the auto-contribute option and collect the remaining balance owed for the item(s). When the share system determines that multiple participants selected the auto-contribute option, the share system may divide the remainder owed for the item between those participants. In the case that the auto-contribute option was not selected, the share system may provide an indication to the seller and participants indicating that the transaction for the items has failed due to lack of complete payment. In addition, the indication may signal to the participants that already paid that the participants will receive a refund accordingly.

In a further implementation, the share system may allow participants other than the original user to further add additional participants to contribute to the total cost of the items. For example, upon receiving a notification requesting payment for an item or items, the participant may further have the option within the notification to add other participants within a certain period of time. With this configuration, the share system may notify the other participants when new participants are added after the initial division of the total cost. The notification can include the new amounts that each participant is requested to pay and may also indicate that the share system may refund any portion of an overpayment that may resulted after a new participant was added lowering the amount that all participants were requested to pay.

In some instances, the share system may also allow a participant to further split the amount that she is expected to pay with others. For example, a participant expected to contribute ten dollars towards a fifty dollar cart of items may add another participant to split her share so that the participant and added participant can each contribute 5 dollars.

In another implementation, the share system may also enable a participant to remove another participant and absorb the removed participant's expected contribution. For example, in a situation where two participants are expected to each pay twenty dollars towards a cart of items, the system may enable one of the participants to absorb the requested amount of the other participant so that one participant ends up paying forty dollars and the other participant pays nothing.

In some instances, the initial user may have the option to turn on or off the ability for participants to add and/or subtract other participants. Additionally, the share system may also set restrictions regarding adding or subtracting participants. As an example, the system may be configured to only allow a participant to absorb the requested amount of another participant in addition to her amount only if the participant submits payment for herself and the absorbed payment at that moment. Other examples of dividing payments and adding or subtracting participants are possible.

In further examples, the share system may also include an option that allows unidentified consumers to contribute to the total cost of an item. Similar to a fundraiser, the share system may enable consumers to contribute to the cost of an item via links that an initial consumer may share with others via email or social media. For example, an initial consumer may utilize the share system to pay for textbooks for schools. The initial consumer may obtain a link from the share system that allows other people to contribute to the total cost for the textbooks and may enable the people to post messages, information, or remain anonymous when contributing to the total cost. The share system may also provide a notification to the initial consumer when a contribution is provided or when a deadline has arrived without complete payment so that the initial consumer can pay a remainder of the total amount owed.

Systems, methods, and devices in which examples may be implemented will now be described in greater detail. In general, described methods may be implemented by various types of computing devices or components of the devices. In one example, a system may include one or more servers, which may receive information from and provide information to a device, such as a mobile phone. However, the described methods may also be implemented by other computing devices, such as a personal computer, a wearable computing device, or a mobile device, among others. Further, an example system may take the form of a computer readable medium, which has program instructions stored thereon that are executable by a processor to provide functionality described herein. Thus, an example system may take the form of a device such as a server, or a subsystem of such a device, which includes such a computer readable medium having such program instructions stored thereon.

Referring to the Figures, FIG. 1 is a simplified block-diagram of an example computing system 100 that can perform various acts and/or functions, such as those described in this disclosure. For instance, computing system 100 may serve as the share system or a portion of the share system. In some implementations, the share system may operate using multiple computing systems that are configured to operate together.

Computing system 100 may include components, such as processor 102, data storage unit 104, communication interface 106, and/or user interface 108. The components can be connected to each other (or to another device, system, or other entity) via connection mechanism 110, and can include more or less components in other example implementations. In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless).

Processor 102 may include a general-purpose processor (e.g., a microprocessor) and/or a special-purpose processor (e.g., a digital signal processor (DSP)). Computing system 100 may include a combination of processors within examples.

Data storage unit 104 may include one or more volatile, non-volatile, removable, and/or non-removable storage components, such as magnetic, optical, or flash storage, and/or can be integrated in whole or in part with processor 102. As such, data storage unit 104 may take the form of a non-transitory computer-readable storage medium, having stored thereon program instructions (e.g., compiled or non-compiled program logic and/or machine code) that, when executed by processor 102, cause computing system 100 to perform one or more acts and/or functions, such as those described in this disclosure. Computing system 100 can be configured to perform one or more acts and/or functions, such as those described in this disclosure. Such program instructions can define and/or be part of a discrete software application. In some instances, computing system 100 can execute program instructions in response to receiving an input, such as from communication interface 106 and/or user interface 108. Data storage unit 104 may also store other types of data, such as those types described in this disclosure.

Communication interface 106 can allow computing system 100 to connect to and/or communicate with another other entity according to one or more protocols. In an example, communication interface 106 can be a wired interface, such as an Ethernet interface or a high-definition serial-digital-interface (HD-SDI). In another example, communication interface 106 can be a wireless interface, such as a cellular or WI-FI interface. A connection can be a direct connection or an indirect connection, the latter being a connection that passes through and/or traverses one or more entities, such as such as a router, switch, or other network device. Likewise, a transmission can be a direct transmission or an indirect transmission.

User interface 108 can facilitate interaction between computing system 100 and a user of computing system 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing system 100 and the user of the computing device system. Computing system 100 may provide various interfaces, including interfaces that enable users to enter information, such as information regarding other participants that may contribute payments for an online order.

In some implementations, computing system 100 may operate as a server or system of servers that communicate with devices of consumers. Particularly, when a user decides to initiate the division of a transaction on the website of a seller, computing system 100 may facilitate the division of the transaction, including providing visual interfaces that can obtain information from consumers.

Figure 2:
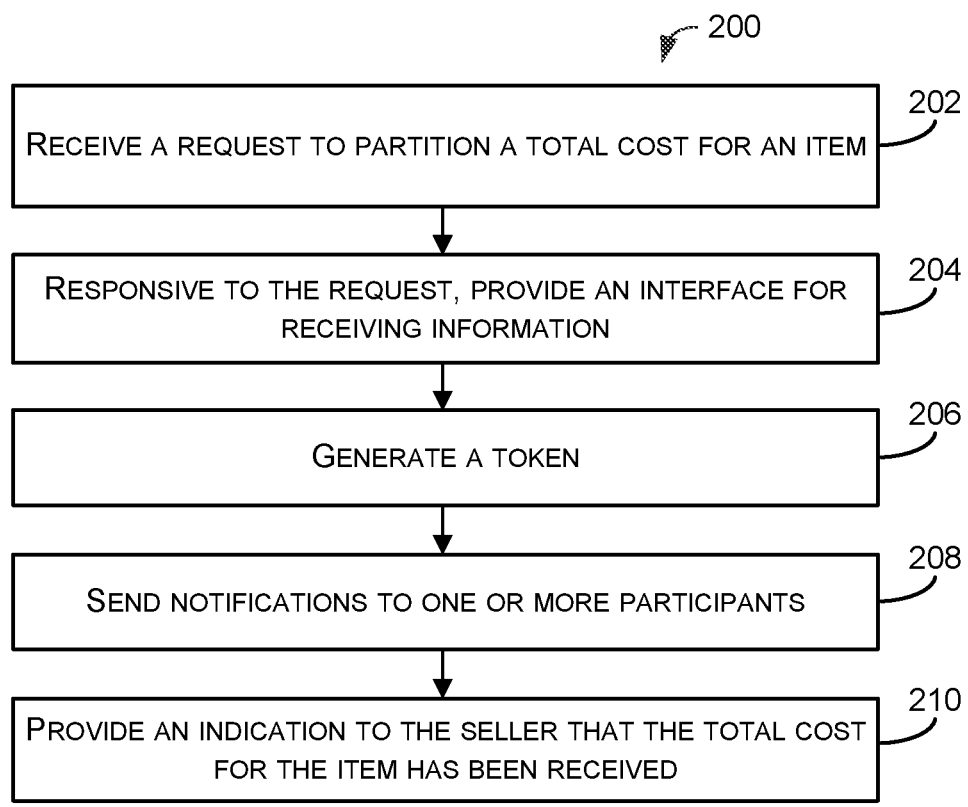
FIG. 2 is a flow chart of an example method for transaction division.

FIG. 2 is a flowchart of example method 200 for transaction division, which represents an example method that may include one or more operations, functions, or actions, as depicted by one or more of blocks 202, 204, 206, 208, and 210, each of which may be carried out by computing system 100 described in FIG. 1, but other systems can also be used. Those skilled in the art will understand that the flowchart described herein illustrate functionality and operation of certain implementations of the present disclosure. In this regard, each block of the flowchart may represent a module, a segment, or a portion of program code, which includes one or more instructions executable by a processor (e.g., processor 102) for implementing specific logical functions or steps in the process. The program code may be stored on any type of computer readable medium, for example, such as a storage device including a disk or hard drive (e.g., data storage unit 104).

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. In examples, a computing system may perform one or more blocks of method 200.

At block 202, method 200 includes receiving a request to partition a total cost for an item. As indicated above, a consumer purchasing an item or multiple items (e.g., cart of items) may select an option to use an example share system that enables the consumer to divide the total cost of the item(s) with other potential participants. The share system may allow the consumer (i.e., initial user) to split the cost of a cart of items by facilitating a notification process and receiving payments from other participants.

In some implementations, the share system may operate as integrated with the website or application of the seller of the item(s). For instance, the initial user may click on a link for the share system positioned on the website of the seller and after detecting the click, the share system may initiate within the website without taking the user to a different website.

In another implementation, the share system may operate independently from the seller's website or application. More specifically, after the user provides the request to use the share feature, the share system may operate within a new browser and redirect to the user to a website or application corresponding to the share system.

Within examples, a user may request to use the share system to partition the total cost when attempting to purchase one or more items, such as materials, products, subscriptions, and digital content, among other possibilities. As such, the user may access the share system to divide the cost of a single item and/or multiple items (e.g., an online cart of items). In some implementations, a user may select a single item from a group of items that she wishes to use the share feature to split the cost when purchasing the items from a seller.

At block 204, method 200 includes providing an interface for receiving information responsive to the request. As indicated above, the share system may detect a request from a consumer (i.e., the initial user) to use the share feature to divide the cost of an item or items with other potential participants (e.g., other people or entities). Upon detecting the request, the share system may perform an initiation process, which may occur directly on the seller's website or separate from the website. The share system's initiation process may include an interface that allows the initial user to provide the system with information, such as login information and contact information for other participants that want to contribute to the transaction.

Figure 3B:
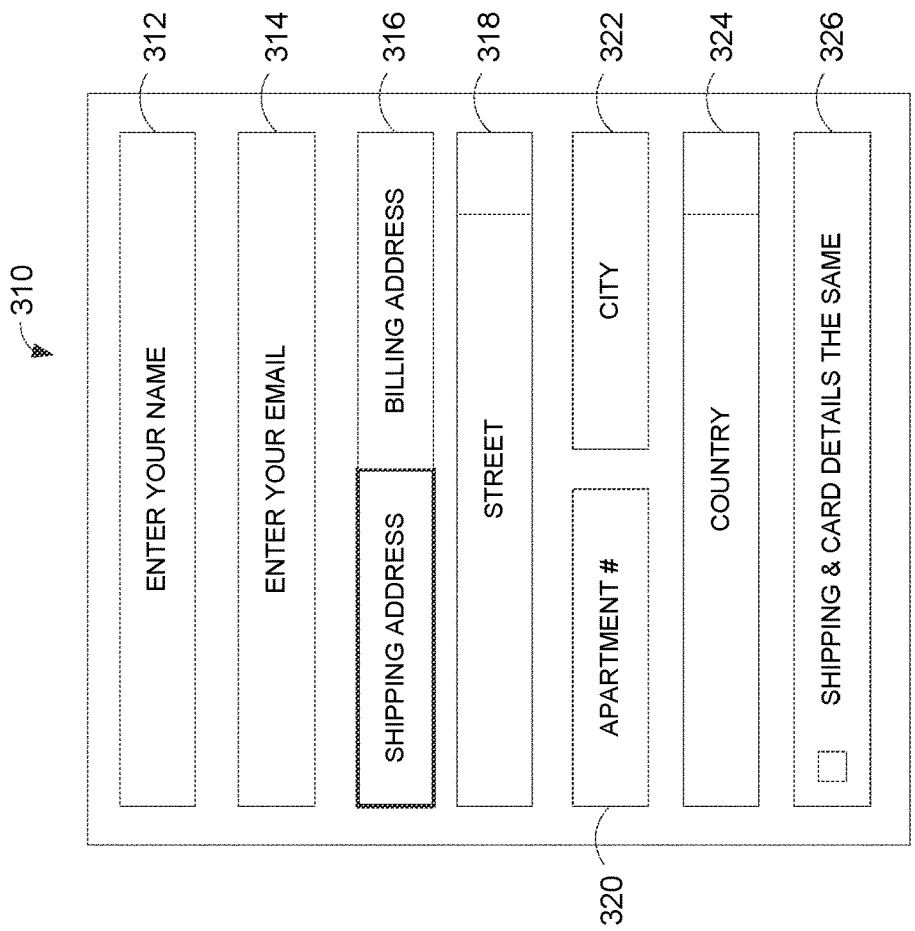
FIG. 3B depicts an example interface for setting up an account with the share system.
Figure 3A:
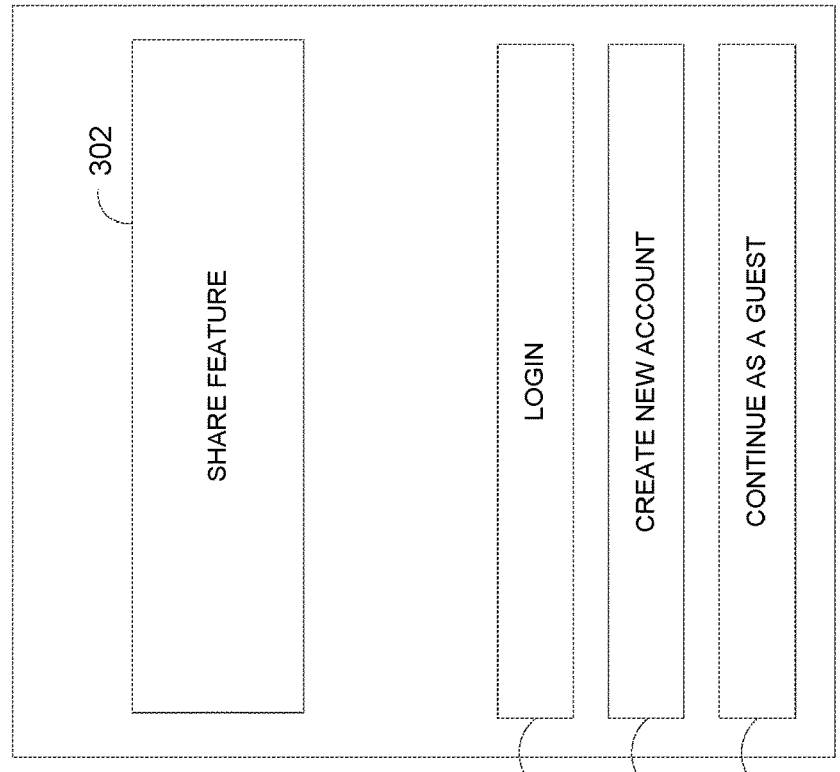
FIG. 3A depicts an example interface for initiating the share feature.

For illustration purposes, FIG. 3A depicts an example interface 300 for initiating the share feature, which includes share feature graphic 302, login option 304, create new account option 306, and continue as a guest option 308. Particularly, example interface 300 represents a visual interface that the share system may provide the initial user to assist the user use the share feature. For example, the seller's website may display interface 300 in response to the initial user selecting a check option to split the total cost of the cart. Within other examples, interface 300 may include more or less components, and may further include auditory and/or tactile indications to assist the initial user complete the share process.

Feature graphic 302 can represent a graphic associated with the share system, such as a graphic of a company that operates the share system. As such, feature graphic 302 can have other configurations or placement within other implementations. For instance, interface 300 may not include feature graphic 302 in another example.

Login option 304 corresponds to a link that the initial user may use to login to access a prior account the user created for use with the share system. More specifically, the share system may require the initial user to provide login information, such as an email account and password or logging in through another account linked to the share system. In some instances, the share system may operate as a mobile application that permits a user to access the account without a password and/or via proving identity through a biometric sensor (e.g., fingerprint, facial recognition).

The share system may use a password to protect information of previously created accounts, such as names, addresses, and stored payment options. In some example implementations, the share system may use multi-factor authentication (e.g., a two-step authentication process) when a user logins to use the share feature, which may provide access only after the user successfully presents separate pieces of evidences confirming that they should have access to that particular account. For example, the share system may request a password from the user and also provide a code to a device (e.g., mobile phone) of the initial user attempting to login to the account. This way, the share system may require the user to further provide the code received securely at the device to confirm the identity of the user for access to the share feature account. In some instances, the system may use a multi-factor authentication process only when a user attempts to access the share feature via an unrecognized device (i.e., a device that has not been used by the user to access the share feature previously).

Create new account option 306 may serve as a link that allows the initial user to create an account for subsequent use with the share system. Particularly, the share system may provide create new account option 306 to enable users of the share feature to easily create accounts to save information for quicker access to the share feature during subsequent uses. Additionally, interface 300 also includes continue as a guest option 308, which enables the initial user to use the share feature without providing login credentials or creating an account. This option may be used by a consumer that may choose to test out the share feature without wanting to sign up.

As indicated above, the share system may also allow a user setting up an account to save information (e.g., credit cards, addresses, contacts) for subsequent use. As an example illustration, FIG. 3B depicts an example interface 310 for setting up an account with the share system. New account interface 310 includes enter your name option 312, enter your email 314, shipping and billing address option 316, street input 318, apartment input 320, city input 322, country 324, and shipping & card details the same option 326, but may include more or less options (i.e., components) within other examples. New account interface 310 enables the initial user to provide information to the share system, and may provide an option for the initial user to save the information for subsequent use.

The share system may request for information from the initial user during the initiation process, which may include share information that specifies one or more accounts that should receive notifications that request payment for portions of the total cost of the item(s). As such, the share system may include one or more interfaces that allow the initial user to easily provide contact information for potential participants that may receive notifications to share that cost of the items. In addition, the share system may include the initial user to interact with the interface to easily divide the total cost of items among the potential participants.

Figure 4B:
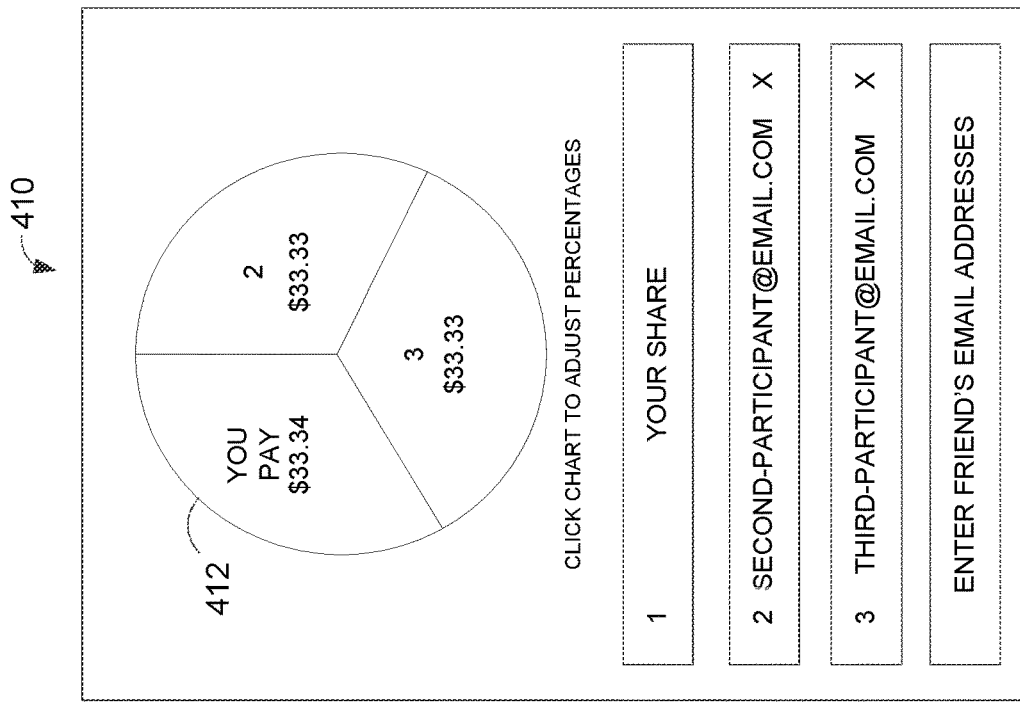
FIG. 4B depicts the example interface of FIG. 4A after the addition of another participant.
Figure 4A:
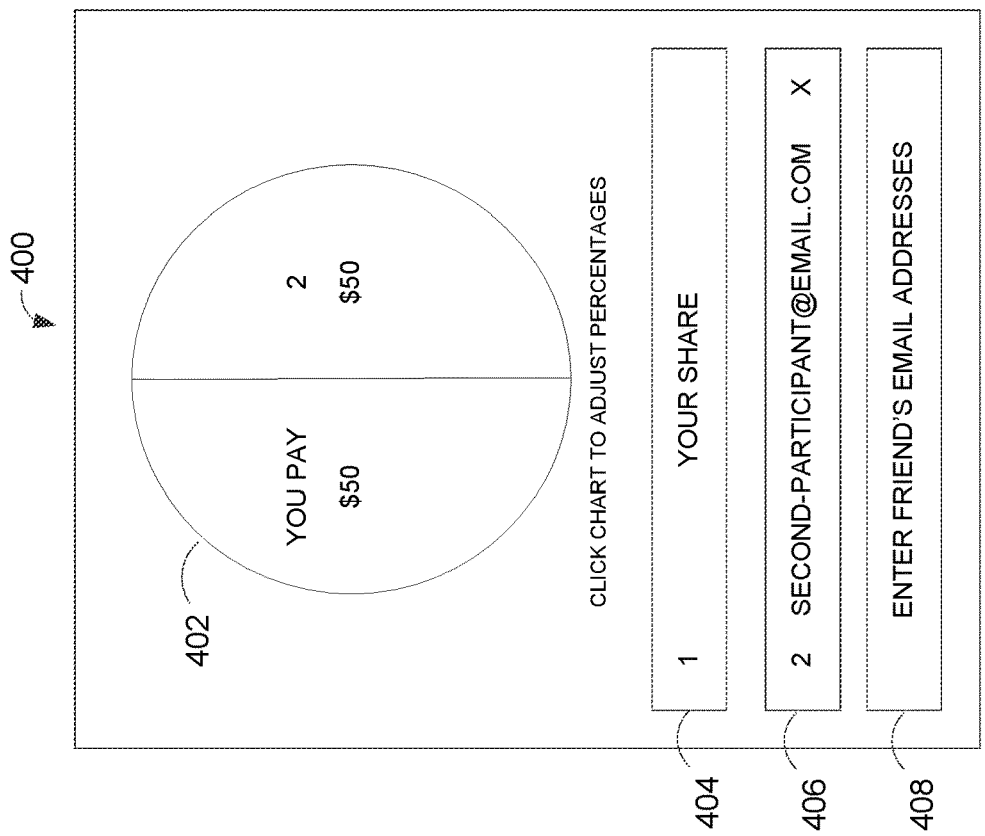
FIG. 4A depicts an example interface for partitioning the total cost of an item.

As an example illustration, FIG. 4A depicts an example interface 400 for dividing the total cost of an item. Particularly, interface 400 shows distribution chart 402, initial user share indication 404, participant contact information 406, and additional participant option 408, but may include more or less components within other implementations. Interface 400 serves as a visual that initial user may use for deciding amounts of the total cost of the item(s) to request from the other participants. As such, interface 400 may have other configurations within examples.

Distribution chart 402, shown as a pie chart, indicates the current division of the total cost of the transaction enabling the initial user to visualize the distribution overall. As such, the share system may enable the user to click on distribution chart 402 to adjust amounts for the participants entered. Although distribution chart 402 shows that the initial user and participant 2 both owe fifty dollars to complete the transaction, distribution chart 402 can also display the amount the participants owe using percentages or other indications. Similarly, distribution chart 402 can take on different forms within other implementations, such as other types of charts or graphs (e.g., bar graph).

Within interface 400 below distribution chart 402, interface 400 includes user share indication 404, which indicates to the initial user how much she owes according to the current division represented within distribution chart 402. Participant contact information 406 corresponds to the contact information for a potential participant that will receive a notification from the share system requesting a portion of the transaction total owed as indicated by distribution chart 402. The share system may use participant contact information 406 for identifying where to send the notification requesting payment. As such, participant contact information 406 can correspond to an email, phone number, or other link that the share system can use to contact the potential participant.

As previously indicated herein, the share system may allow the initial user to add participants via additional participant option 408. Additional participant option 408 may include an indication that signals to the initial user how to add another participant to share the cost, such as stating "enter friend's email addresses" as the indication. With this configuration, the initial user may enter a participant's phone number, email, or other link to enable the share system to send a notification to the potential participant requesting payment.

In a further aspect, the share system may enable a user to connect the user's email account or other accounts (e.g., mobile phone contact list) so that the share feature may access the contacts of the user. This way, the share system may recognize and suggest contacts to the initial user when the user initially starts adding others for sharing the cost. For example, the share feature may detect the user typing the letter "A" and display email addresses of contacts that start with the letter "A". In other implementations, the share system may display frequently used contacts so that the user may quickly select those contacts.

In some implementations, when the initial user adds one or more contacts for sharing the cost of items, the share system may be configured to initially divide the cost of the items equally. For example, FIG. 4B depicts the example interface of FIG. 4A after the addition of another participant, which shows distribution chart 412 (corresponding to distribution chart 402) with the total cost of the item divided equally between the original participants and the newly added participant. As such, the user may further adjust the amounts by changing the percentage or dollar amount that each participant will be notified to pay, such as by clicking on distribution chart 412. Particularly, when the user adjusts the percentage of one participant, the sharing system may automatically adjust the percentages owed by the other participants so that the total cost of the transaction is still completely covered by the amounts requested from the participants. In another implementation, the share system may initially have a newly added participant set as owing none of the total amount of the items until the initial user actively adjusts the amounts that the various participants are requested to contribute.

Figures 4C, 4D:
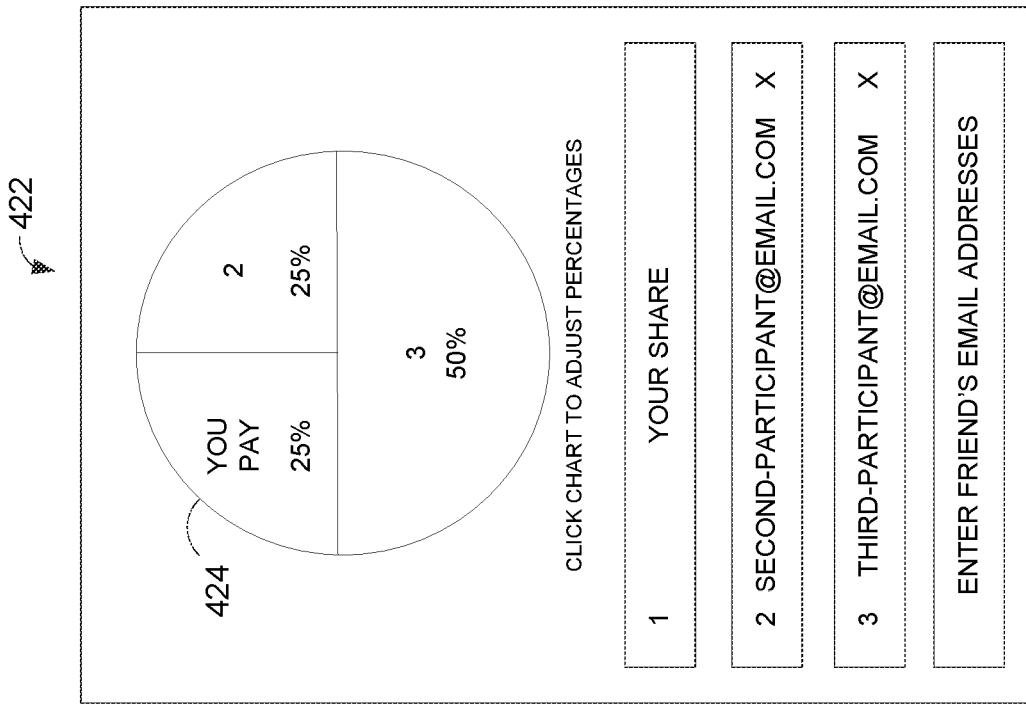
FIG. 4C depicts an example penny management operation.
FIG. 4D depicts the example interface of FIGS. 4A-4B displaying adjusted amounts owed by the participants.

As shown in FIG. 4B, the three participants are splitting an item or items that cost one hundred dollars total, which is a dollar amount that cannot be split equally three ways. More specifically, when the total cost of an item cannot be split equally due to an extra cent (e.g., $100 dollars divided among three participants), the share system may use a penny management algorithm to determine which participant receives the penny. Particularly, FIG. 4C depicts an example penny management software operation, which may be used to determine which participant(s) should receive the extra cent or cents within their requested amounts when there is an inability to divide the total cost exactly equal among the participants. In other examples, however, the share system may use other algorithms to manage extra cents that may occur during the division of the total cost of items.

FIG. 4D depicts the example interface 422 of FIGS. 4A-4B displaying adjusted amounts owed by the participants. Particularly, interface 422 includes distribution chart 424 (which corresponds to distribution charts 402, 412) showing that the initial user and the second participant both owe twenty percent of the total cost of the items, and the third participant owes the remaining fifty percent of the total cost of the items. As such, distribution chart 424 may represent the new division of the transaction after the initial user manipulated distribution chart 412 shown in FIG. 4B. Although distribution chart 424 uses percentages to show the amount of the total cost each participant owes, distribution chart 424 can also show the dollar amounts owed in other implementations.

After providing information for dividing the transaction, the initial user may pay her portion of the total amount owed. In some implementations, the share system may require the initial user to provide a partial payment (e.g., the amount owed by the initial user) as a final step to complete setting up the division of the transaction. Particularly, the share system may require the initial payment from the user to serve as an indication to the seller of the items that the initial user reasonably expects to purchase the items. As such, the share system may provide notifications to other participants only after receiving the initial payment from the initial user. In a further implementation, however, the share system may permit the initial user to delay her payment for some period of time.

To provide a payment, participants may contribute through credit or debit cards, among other possibilities. As previously indicated, the share system may allow users with accounts set up to save information, including contacts, credit/debit cards, and addresses. As an example illustration, FIG. 5A depicts an example payment selection interface 500, which includes item information and total cost 502, saved cards 504, amount desired 506, deadline option 508, keep me logged in option 510, and navigation option 512. Interface 500 enables the initial user and/or other participants with accounts set up for the share system to quickly enter a new credit card, select a previously saved credit card, and set a deadline for payments for other participants to complete payment for the items by. The information within interface 500 may help the initial user confirm that the initial set up was set up as desired.

Within interface 500, deadline option 508 may allow the initial user to set a goal date for completing the payment for the items. As previously indicated herein, the share system may inform potential participants about the deadline within the notification requesting payments. In some instances, the share system may put limits on when the user may set the deadline so that the user does not set a deadline that is too far away for the seller of the item(s) to accommodate.

In another implementation, the share system may automatically set a deadline or deadlines for the participants to complete the payments. The share system may set the deadline based on various factors, such as the number of participants, input from the seller of the items, or the types of items or overall costs of the item.

In a further aspect, interface 500 or another interface may include an auto-contribute option that a user can select to cause the system to automatically divide the remaining cost of for an item or items when one or more participants fail to pay their portions of the cost by the deadline. For example, a scenario may occur where a user wants to divide a thirty dollar item with two other participants equally. As such, the user and two other participants may receive notifications to each pay ten dollars for the item by a given deadline. However, if one of the participants fails to pay her portion (i.e., ten dollars) by the deadline, the system may automatically divide that participant's portion (i.e., ten dollars) between the remaining two participants when both of the participants who paid selected the auto-contribute option. As a result, the remaining two participants would end up paying fifteen dollars to complete rather than only ten dollars each due to the prior selection of the auto-contribute option. In the case that the auto-contribute option was not selected, the system may cancel the purchase of the item and send notification to the participants that already paid indicating that all participants did not pay their respective shares by the deadline and any money paid will be refunded.

Within implementations, the share system may present the auto-contribute option in different ways. For example, the system may present the option at the same time that the system allows the user to enter participants. With this configuration, the system may allow the initial user to decide whether the auto-contribute option is selected. In another implementation, the system may allow every participant to decide whether or not to select the auto-contribute option when the participant pays her portion. As such, the system may divide any unpaid portions of the total cost of an item or items among the participants that selected the auto-contribute option.

FIG. 5B depicts an example payment confirmation interface 514, which includes item information and total cost 516 (corresponds to the item information and total cost 502 shown in FIG. 5A), your share to pay amount 518, distribution of all participants 520 and complete payment option 522. As such, the share system may present payment confirmation interface 514 for the initial user to review and confirm the payment distribution and the amount the she wants to initially contribute. In some instances, payment confirmation interface 514 may include more or less components, such as presenting other information to the initial user.

Figure 5C:
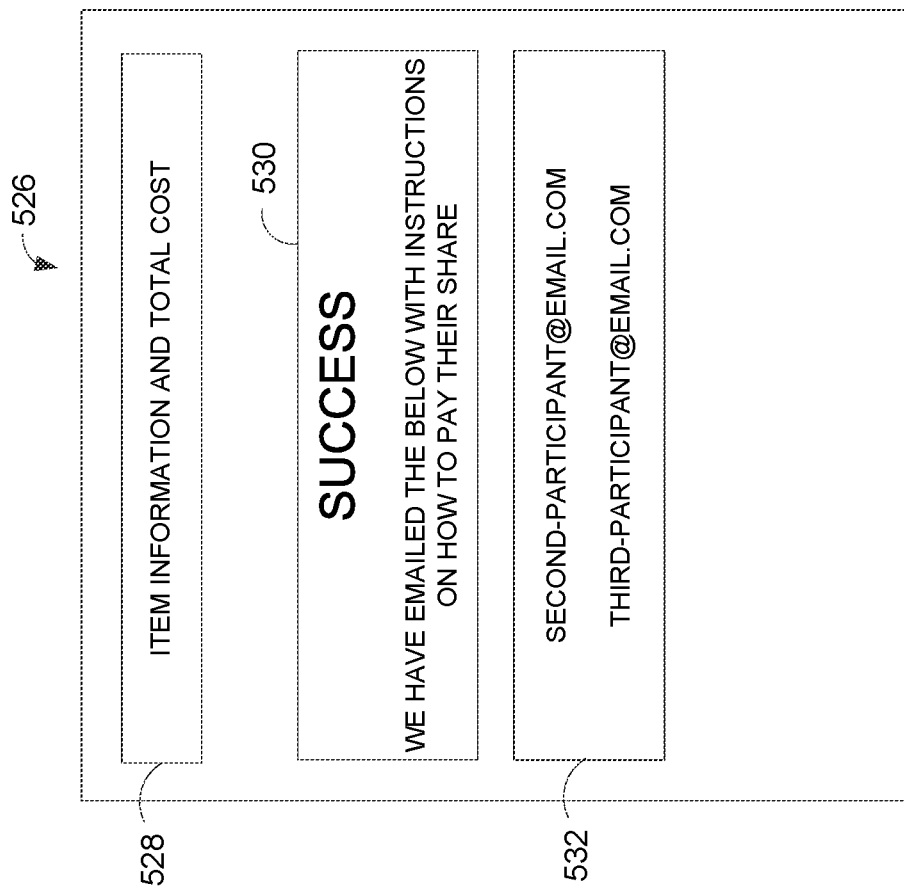
FIG. 5C depicts an example receipt interface.

FIG. 5C depicts an example receipt interface 526, which includes item information and total cost 528, share feature success indication 530, and notification list 532. To show that the initial transaction using the share feature was successful, the share system may provide receipt interface 526 to the initial user. Particularly, the share system may display receipt interface 526 when the initial user contributes her portion and provides enough information for the share system to notify other potential participants about completing the transaction.

As shown, receipt interface 526 may display the total cost 528 for the item and possibly additional information about the item, such as color, seller, etc. Share feature success indication 530 may inform the initial user that the transaction has been successfully initiated and notification list 532 may remind the initial user which participants are receiving notifications requesting payments.

Referring back to FIG. 2, method 200 at block 206 includes generating a token. When the share system completes the initial set up for dividing the transaction with others, including receiving payment and contact of other participants from the initial user, the share system may generate a unique token that represents the cart of items. In particular, the generated token may include the information, such as details about item and seller, the share information provided by the initial user, and the deadline by which payment for remaining portion(s) of the total cost for the item(s) must be received. As such, the share system may generate the token to have a unique configuration for secure transfer and storage. For example, FIG. 6 depicts an example token generation operation, which includes software that the share system may execute to develop the unique token with information corresponding to the particular cart of items.

In some implementations, the share system may use the generated token to check for subsequent payments from notified participants, which may include performing a periodic check of the generated token and other tokens corresponding to other potential share feature transactions. In addition, the share system may also send the token securely to the seller, such as upon creation of the token or completion of the transaction.

Referring back to FIG. 2, method 200 at block 208 may include sending notifications to one or more participants. In order to complete the transaction for the desired item(s), the share system may provide notifications requesting payments to potential participants using the contact information specified by the initial user.

The notifications may arrive as an email, application alert, text message, among other possibilities, and may include various information, such as information about the item, the amount of the requested payment, how to submit the payment, information about the initial user, and the deadline for submitting the payment, etc. In some instances, the share system may include an option to create a new account within the notification that enables a potential participant to create an account with the share system for subsequent use.

As previously shown in FIG. 5C, the share system may indicate to the initial user when the notifications are sent to potential participants that may contribute to completing the transaction. The notifications may include the deadline specified previously by the user and/or by the system.

In a further implementation, the share system may provide the initial user with the ability to set a periodic reminder for the share system to send to the potential participants. For example, in an example transaction when the initial user set the deadline as two weeks away, the share system may allow the initial user to set up reminders for the participants receiving the notification about contributing to the overall cost of the items, such as a reminder after the first week and another reminder a day before the deadline.

In some implementations, users of the share system, including potential participants that have accounts with the share system, may be able to set up how they prefer to receive notifications through settings within their respective accounts. For instance, the share system may enable a user with an account to select to receive notifications via text message alerts rather than email alerts.

At block 210, method 200 includes providing an indication to the seller that the total cost for the item has been received. The share system may use the generated token corresponding to the item to check for incoming payments. For example, the share system may operate in a loop periodically checking for payments using the generated cart. The share system may also send the generated token to another entity that monitors for incoming payments. In some examples, the share system may detect incoming portions of the payment for the items in other ways.

In some instances, upon receiving the total cost of the items by the deadline, the share system may provide an indication to the seller that complete payment was received. For instance, the share system may generate a report based on the generated token that includes payment information for the seller. In some examples, the share system may transmit the generated token to the seller as a way to indicate that the complete payment was received.

In some implementations, the share system may determine that the deadline for receiving payments from potential participants has passed and all payments have not yet been received. As a result, the share system may check to see if at least one participant has selected the auto-contribute option, which may include checking the previously generated token. In the case that the auto-contribute option was selected, the share system may automatically charge the participant(s) that selected the auto-contribute option for the remaining balance owed for the item(s). In the situation that the share system determines that multiple participants selected the auto-contribute option, the share system may divide the remainder owed for the item between those participants. In the case that the auto-contribute option was not selected by any participant, the share system may provide an indication to the seller and participants indicating that the transaction was not completed. The share system may also inform participants that refunds will be distributed for any payments already received. In another implementation, the share system may provide the option to the participants who have paid to complete payment for the cart within the notification that the deadline has passed.

In another example implementation, the share system may have a communication connection, such as a particular web link or Uniform Resource Identifier (URL), set up with the seller. With this configuration, the share system may securely share information with the seller, including generated tokens. As such, upon receiving the entire payment for a transaction, the share system may provide the generated token with an indication that the item(s) have been completely paid for using the particular communication connection (e.g., securely transferring the generated token to the URL of the seller). For instance, the share system may send a webhook to the URL for the seller. The seller may reply with a communication confirming the reception of the indication and generated token so that the share system receives a signal that the seller will complete the transaction (e.g., ship the purchased items).

In some examples, the seller may respond to the share system with a status code (e.g., HTTP Status Code 201) and/or other information that indicates that everything was processed successfully on the seller's end. The seller and the share system may also use other security features, such as security keys to authenticate communications that occur between the share system and the seller. The security keys (e.g., codes) may exist from the generation of a new token and/or may include a security key that the seller and share system may use for securing multiple tokens and communications between them.

In some examples, the share system may cause one or more items to be shipped to a consumer or multiple consumers in response to determining that complete payment for the items has been received. For instance, the share system may utilize the generated token to determine where to ship purchased items. In further examples, the share system may also generate one or more items purchased by a group of consumers. For instance, upon determining that complete payment was received from a set of consumers, the share system may create one or more items that the consumers purchased. Within further examples, the share system may perform other computational based actions in response to determining that a set of consumers completely paid for the total cost of a cart of items.

In a further example, the share system may operate at a restaurant location and enable multiple customers to split items on a check. Particularly, the share system may enable an initial user to select the items ordered at the restaurant that at least another participant wishes to also pay for. With this configuration, the restaurant location may enable consumers to quickly split the costs for various items using the techniques described above.

In another example, the share system may enable an initial consumer to purchase a cart of items for the total price. This way, the seller may provide the items to the consumer. The share system may further enable the consumer to request and collect portions of the total price paid from other consumers. As a result, the transaction may occur right away, but the initial consumer may still divide the total cost of the items with other potential payees.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

I claim:

1. A method comprising:
   receiving, at a computing system, a request to partition a total cost for an item selected from an online store platform with one or more participants, wherein the request is received via a network connection and from a computing device associated with a first account;
   responsive to receiving the request, causing, by the computing system via the network connection, a graphical user interface (GUI) to display on the computing device, wherein the GUI is configured to receive payment parameters comprising: an initial portion of the total cost for the item from the first account and a requested amount and contact information for each participant, and wherein the GUI includes:
      (i) an interactive chart configured to receive user input and represent the partition of the total cost for the item such that a sum of the initial portion and requested amounts for the one or more participants always equals the total cost for the item, and
      (ii) a selectable auto-contribute option;
   generating a token having a unique configuration based on the payment parameters;
   responsive to generating the token, sending, by the computing system using the contact information for each participant represented in the token, notifications to the one or more participants, wherein each notification includes:
      (i) the requested amount,
      (ii) a deadline for submitting the requested amount, and
      (iii) the selectable auto-contribute option;
   responsive to detecting that at least one participant failed to pay the requested amount, referencing the token to determine given participants, wherein the given participants include:
      (i) the first account based on the first account selecting the auto-contribute option; and
      (ii) at least one of the one or more participants based on the at least one of the one or more participants selecting the auto-contribute option;
   dividing the remainder of the total cost for the item among the given participants; and
   responsive to receiving the total cost for the item by the deadline, sending, by the computing system via the network connection and to the online store platform, the token with an indication that the total cost for the item has been received.

2. The method of claim 1, wherein the item was selected on a website of a seller.

3. The method of claim 1, wherein the request to partition the total cost for the item corresponds to a request to partition the total cost for a cart of items.

4. The method of claim 1, wherein causing the GUI to display on the computing device comprises:
  providing an option to create a new account for use with subsequent requests to partition a total cost for an item.

5. The method of claim 1, further comprising: receiving login information that includes using a two-step authentication process.

6. The method of claim 1, wherein the payment parameters comprises:
  a first requested amount and contact information for a first participant; and
  a second requested amount and contact information for a second participant.

7. The method of claim 6, wherein the first requested amount is different from the second requested amount.

8. The method of claim 1, further comprising: detecting, at the computing system using the token, when a given requested amount is received from a participant of the one or more participants.

9. A system, comprising:
  one or more processors; and
  a non-transitory computer-readable medium, configured to store instructions, that when executed by the one or more processors, cause the system to perform functions comprising:
    receiving a request to partition a total cost for an item selected from an online store platform with one or more participants, wherein the request is received via a network connection and from a device associated with a first account;
    responsive to receiving the request, causing, via the network connection, a graphical user interface (GUI) to display on the device, wherein the GUI is configured to receive payment parameters comprising: an initial portion of the total cost for the item from the first account and a requested amount and contact information for each participant, and wherein the GUI includes:
      (i) an interactive chart configured to receive user input and represent the partition of the total cost for the item such that a sum of the initial portion and requested amounts for the one or more participants always equals the total cost for the item, and
      (ii) a selectable auto-contribute option;
    generating a token having a unique configuration based on the payment parameters;
    responsive to generating the token, sending, using the contact information for each participant represented in the token, notifications to the one or more participants, wherein each notification includes:
      (i) the requested amount,
      (ii) a deadline for submitting the requested amount, and
      (iii) the selectable auto-contribute option;
    responsive to detecting that at least one participant failed to pay the requested amount, referencing the token to determine given participants, wherein the given participants include:
      (i) the first account based on the first account selecting the auto-contribute option; and
      (ii) at least one of the one or more participants based on the at least one of the one or more participants selecting the auto-contribute option;
    dividing the remainder of the total cost for the item among the given participants; and
    responsive to receiving the total cost for the item by the deadline, sending, via the network connection and to the online store platform, the token with an indication that the total cost for the item has been received.

10. The system of claim 9, wherein the GUI is integrated within the online store platform.

11. The system of claim 9, wherein sending notifications to the one or more participants comprises:
  sending email notifications to email accounts of the one or more participants.

12. The system of claim 9, wherein the functions further comprise:
  determining that the total cost for the item has not been received by the deadline; and
  based on determining that the total cost for the item has not been received by the deadline, causing any payments of the total cost for the item to be refunded.

13. The system of claim 9, where the functions further comprise:
  responsive to generating the token, storing the token with a plurality of other tokens that correspond to other outstanding transactions.

14. The system of claim 9, wherein the functions further comprise: providing an option to create a new account for subsequent requests to partition a total cost for an item.

15. The system of claim 9, wherein the payment parameters comprises:
  a first requested amount and contact information for a first participant; and
  a second requested amount and contact information for a second participant.

16. A non-transitory computer-readable medium configured to store instructions, that when executed by a computing system, cause the computing system to perform functions comprising:
  receiving a request to partition a total cost for an item selected from an online store platform with one or more participants, wherein the request is receive via a network connection and from a computing device associated with a first account;
  responsive to receiving the request, causing, via the network connection, a graphical user interface (GUI) to display on the computing device, wherein the GUI is configured to receive payment parameters comprising: an initial portion of the total cost for the item from the first account and a requested amount and contact information for each participant, and wherein the GUI includes:
    (i) an interactive chart configured to receive user input and represent the partition of the total cost for the item such that a sum of the initial portion and requested amounts for the one or more participants always equals the total cost for the item, and
    (ii) a selectable auto-contribute option;
  generating a token having a unique configuration based on the payment parameters;
  responsive to generating the token, sending, using the contact information for each participant represented in the token, notifications to the one or more participants, wherein each notification includes:
    (i) the requested amount,
    (ii) a deadline for submitting the requested amount, and
    (iii) the selectable auto-contribute option;
  responsive to detecting that at least one participant failed to pay the requested amount, referencing the token to determine given participants, wherein the given participants include:

(i) the first account based on the first account selecting the auto-contribute option; and
(ii) at least one of the one or more participants based on the at least one of the one or more participants selecting the auto-contribute option;

dividing the remainder of the total cost or the item among the given participants; and responsive to receiving the total cost for the item by the deadline, sending, via the network connection and to the online store platform, the token with an indication that the total cost for the item has been received.

\* \* \* \* \*